United States Patent

Masias

(10) Patent No.: US 9,786,969 B2
(45) Date of Patent: Oct. 10, 2017

(54) MAGNETICALLY CONTROLLED TRACTION BATTERY THERMAL PLATE

(71) Applicant: Ford Global Technologies, LLC, Dearborn, MI (US)

(72) Inventor: Alvaro Masias, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 375 days.

(21) Appl. No.: 14/538,388

(22) Filed: Nov. 11, 2014

(65) Prior Publication Data

US 2016/0133998 A1    May 12, 2016

(51) Int. Cl.
| | |
|---|---|
| H01M 10/657 | (2014.01) |
| B60L 11/18 | (2006.01) |
| H01M 10/613 | (2014.01) |
| H01M 10/625 | (2014.01) |
| H01M 10/6567 | (2014.01) |
| H01M 10/6556 | (2014.01) |
| H01M 10/48 | (2006.01) |

(52) U.S. Cl.
CPC ....... H01M 10/657 (2015.04); B60L 11/1874 (2013.01); H01M 10/613 (2015.04); H01M 10/625 (2015.04); H01M 10/6556 (2015.04); H01M 10/6567 (2015.04); *H01M 10/486* (2013.01); *H01M 2220/20* (2013.01)

(58) Field of Classification Search
CPC ............. H01M 10/657; H01M 10/625; H01M 10/6567; H01M 10/6556; H01M 10/613; H01M 10/486; H01M 2220/20; B60L 11/1874
See application file for complete search history.

(56) References Cited

U.S. PATENT DOCUMENTS

| | | | |
|---|---|---|---|
| 7,600,381 B2 | 10/2009 | Verbrugge et al. | |
| 8,730,674 B2 | 5/2014 | Dede et al. | |
| 8,783,396 B2 | 7/2014 | Bowman | |
| 2007/0039721 A1* | 2/2007 | Murray | C09K 5/10 165/109.1 |
| 2009/0126922 A1* | 5/2009 | Vetrovec | F25B 21/00 165/185 |

(Continued)

OTHER PUBLICATIONS

A.G. Olabi, et al., Technical Report, Design and application of magneto-rheological fluid, Science Direct, Materials & Design, 28 (2007) 2658-2664, www.sciencedirect.com, Available online Nov. 28, 2006.

*Primary Examiner* — Lisa S Park
(74) *Attorney, Agent, or Firm* — Brooks Kushman P.C.

(57) ABSTRACT

A vehicle traction battery assembly is provided. The vehicle traction battery assembly may include an array of battery cells, a thermal plate in thermal communication with the array and defining a coolant path, and an electromagnet. The electromagnet may be positioned proximate to the path and configured to selectively output a magnetic field to influence movement of magnetic particles within coolant flowing through the path to control the flowing. The assembly may also include at least one sensor located proximate to the array and configured to output a signal indicative of a temperature of at least one of the battery cells. A controller may be configured to, in response to the signal, direct the electromagnet to adjust the magnetic field.

7 Claims, 3 Drawing Sheets

(56) References Cited

U.S. PATENT DOCUMENTS

2012/0257646 A1* 10/2012 Yee ..................... G05D 23/192
                                                                  372/36
2012/0298433 A1* 11/2012 Ohkura ............... H01M 2/1077
                                                                  180/65.1

* cited by examiner

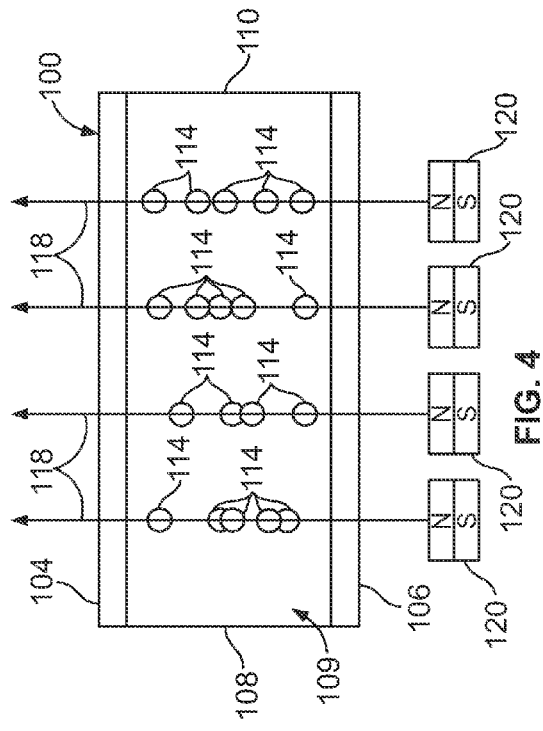
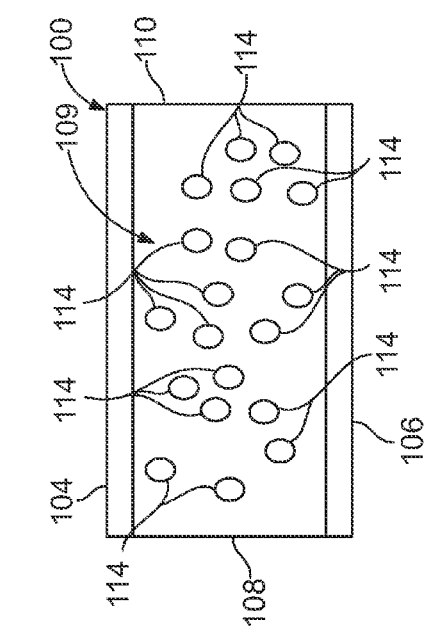
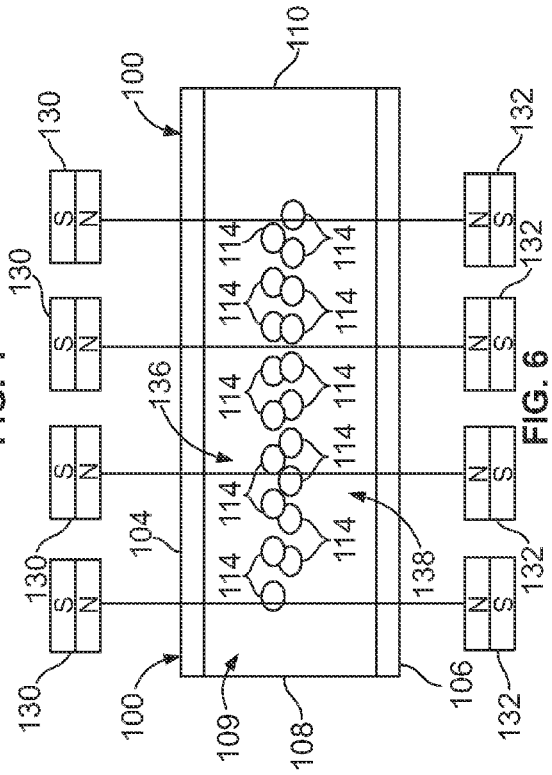

MAGNETICALLY CONTROLLED TRACTION BATTERY THERMAL PLATE

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle traction battery assembly includes an array of battery cells, a thermal plate in thermal communication with the array and defining a coolant path, and an electromagnet. The electromagnet is positioned proximate to the path and configured to selectively output a magnetic field to influence movement of magnetic particles within coolant flowing through the path to control the flowing. The electromagnet may be further positioned such that the magnetic particles, in a presence of the magnetic field, gather at walls defining the coolant path. The electromagnet may be further positioned such that the magnetic particles, in a presence of the magnetic field, gather at locations between walls defining the coolant path to further define two coolant sub-paths. The assembly may also include at least one sensor located proximate to the array and configured to output a signal indicative of a temperature of at least one of the battery cells. A controller may be configured to, in response to the signal, direct the electromagnet to adjust the magnetic field. The electromagnet may be further configured to selectively output a pulsed magnetic field to induce turbulence into the coolant flowing through the path. The coolant path may include more than one channel and the electromagnet may be further configured to selectively output the magnetic field to restrict the coolant flowing through at least one of the channels. The coolant may be a magnetorheological fluid or ferrofluid.

A vehicle traction battery assembly includes an array of battery cells, a thermal plate in thermal communication with the array and defining a flow field therein, and a magnetic valve assembly. The magnetic valve assembly is configured to selectively output a magnetic field to tune a viscosity of magnetic coolant within a vicinity of the magnetic field and flowing within the flow field to promote or inhibit the flowing within the flow field. The flow field may include first and second channels and the magnetic valve assembly may be further configured to selectively output the magnetic field to tune the viscosity such that the magnetic coolant flows through the second channel and not the first channel. The thermal plate may define a plurality of valve zones. The magnetic valve assembly may include an electromagnet positioned proximate to each of the valve zones. The magnetic valve assembly may be further configured to operate the electromagnets to selectively control the flowing of magnetic coolant within each of the valve zones. The magnetic valve assembly may be further configured to selectively output the magnetic field based on a temperature of the battery cells. The magnetic valve assembly may be further configured to selectively output the magnetic field to promote the flowing within portions of the flow field adjacent to the battery cells having a temperature exceeding a threshold value. The magnetic coolant may be a magnetorheological fluid or ferrofluid.

A vehicle includes an array of battery cells, a thermal plate in thermal communication with the array and defining a flow field, coolant distributed within the flow field and having magnetic particles therein, and an electromagnetic valve assembly. The electromagnetic valve assembly is arranged proximate to and outside of the flow field, and configured to selectively output a magnetic field to influence configurations of the particles to alter a flow of the coolant through the flow field. The electromagnetic valve assembly may include at least one electromagnet. The electromagnetic valve assembly may be further configured to vary the output of the magnetic field such that the particles gather in a central region of the flow field or at walls defining the flow field. The flow field may include a plurality of multi-pass channels and the electromagnetic valve assembly may be further configured to selectively output the magnetic field to direct the flow of the coolant within some of the multi-pass channels. The vehicle may include a controller configured to, in response to temperature data for the battery cells, control operation of the electromagnetic valve assembly. The coolant may be a magnetorheological fluid or ferrofluid.

BRIEF DESCRIPTION OF THE DRAWINGS

FIG. 3 is a plan view of an example of a thermal plate having coolant within a flow field.

FIG. 4 is a plan view of the thermal plate from FIG. 3 showing an example of an output of an electromagnetic valve assembly.

FIG. 5 is a plan view of another example of a thermal plate showing another example of an output of an electromagnetic valve assembly.

FIG. 6 is a plan view of the thermal plate from FIG. 5 showing another example of an output of an electromagnetic valve assembly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
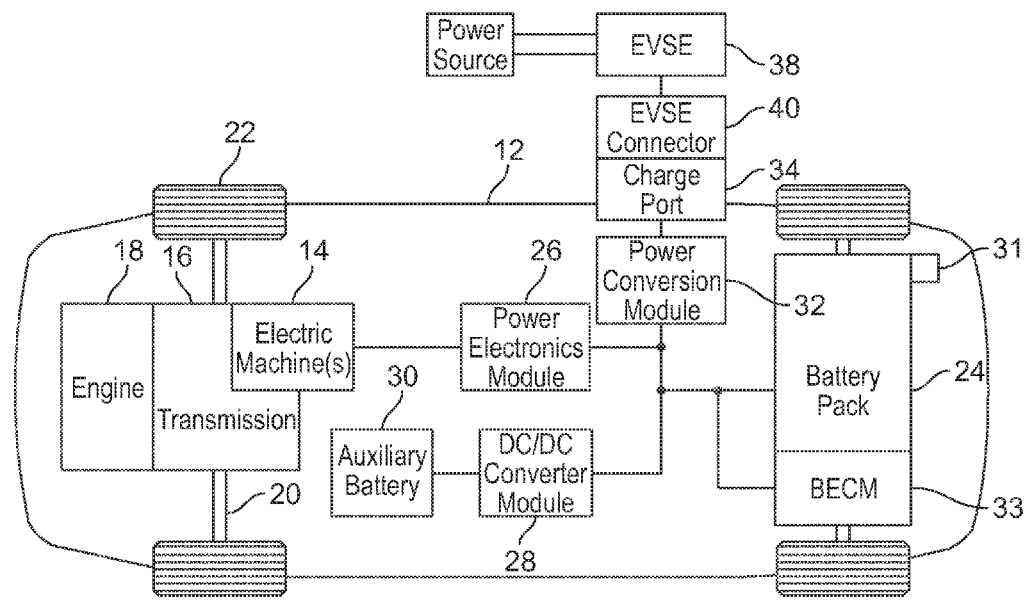
FIG. 1 is a schematic illustrating a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The high voltage DC output may also be converted to a low voltage DC output for applications such as vehicle stop/start. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
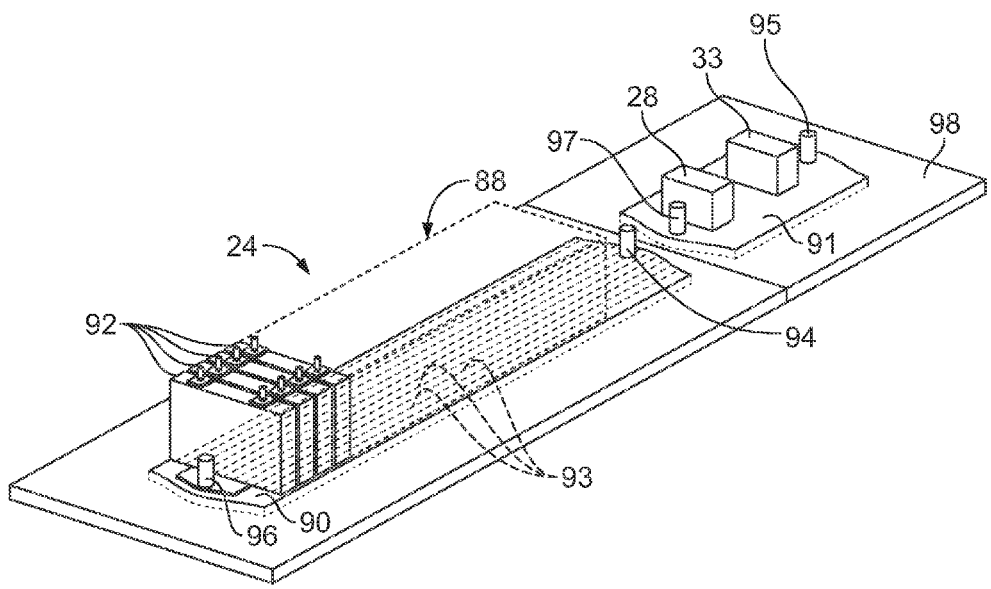
FIG. 2 is a perspective view of an example of a portion of a traction battery.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell arrays 88 may be positioned at any suitable location in the vehicle 12.

As described above, electrified vehicles utilize HV battery systems. The HV battery systems benefit from uniform temperature conditions of the battery cells within the HV battery system. Coolant is typically pumped through a closed loop path in liquid cooled HV battery systems. The coolant may accumulate heat from the battery cells and other components as the coolant flows through the closed loop path. Battery cells of the HV battery system may age differently due to varying temperatures of the battery cells during operation of the electrified vehicle. This varied aging between the battery cells may result in performance degradation of the HV battery system and the electrified vehicle. Thermal plates which assist in cooling the battery cells may often include channel configurations to distribute the coolant throughout the thermal plate to manage thermal conditions of the battery cells. The thermal plates may be formed in various fashions, but costs to produce the thermal plates may increase due to complexities of the channel configurations.

FIG. 3 shows an example of a portion of a thermal management system for an HV battery system which may use a magnetic valve assembly to control a flow of coolant having magnetic particles. A thermal plate 100 may include a first wall 104 and a second wall 106. An inlet 108 may deliver coolant 109 to a flow field defined by the first wall 104 and the second wall 106. An outlet 110 may remove coolant from the flow field. A magnetic valve assembly may assist in controlling coolant flow within the thermal plate 100. For example, the coolant 109 may include magnetic particles 114 that may be magnetically optimizable. Magnetorheological (MR) fluid and ferrofluid are two examples of magnetically optimizable liquids which may be used for the coolant 109. When MR fluid or ferrofluid is exposed to a magnetic field, a viscosity of the fluid may be tuned to selectively inhibit or promote flow. For example, the magnetic field may influence a position or movement of the magnetic particles. Various ratios of magnetic particles and fluid are available to provide multiple options for a composition of the coolant 109. A size and type of the magnetic particle are two factors which may influence selection of the composition of the coolant 109.

In FIG. 3, the coolant 109 is shown with the magnetic particles 114 in a normal or random configuration. For example, in the case of MR fluids, distribution of the magnetic particles 114 is driven by coolant 109 flow, whereas in the case of ferrofluids, distribution of the magnetic particles 114 is driven by Brownian motion. Magnetic particles in both MR fluids and ferrofluids experience a magnetic force parallel to the line of magnetic flux created by an electromagnet. The applied magnetic field is anisotropic, with regions of greater and lesser magnetic flux due to magnetic pole location. The magnetic particles 114 may be oriented in specific configurations to promote or inhibit coolant 109 flow by selectively placing single or multiple electromagnets adjacent to the coolant 109. The electromagnets may also be configured to pulse the output of the magnetic field such that the coolant 109 reaches an intermediate condition in which laminar coolant 109 flow is induced to become more turbulent to increase heat transfer properties of the coolant 109.

FIG. 4 shows an example in which the magnetic particles 114 are reconfigured due to output of a magnetic field 118 generated by electromagnets 120. The electromagnets 120 may be placed adjacent the flow field of the thermal plate 100 to selectively control flow of the coolant 109 by exerting a force against the magnetic particles 114. In this example, the electromagnet 120 is activated to output the magnetic field 118 as represented by directional arrows. The magnetic field 118 exerts the force on the magnetic particles 114 such that a positioning of the magnetic particles 114 may be reconfigured. In this example, the magnetic particles 114 are shown realigned in a substantially liner configuration in comparison with the normal or random configuration shown in FIG. 3. In FIG. 4, the four electromagnets 120 are shown to create four columns of the magnetic particles 114 being driven toward the wall 104 by the magnetic force of the magnetic field 118. The applied magnetic force in this example is perpendicular to the direction of coolant 109 flow and by causing motion of the magnetic particles 114 into the wall 104 it is possible to increase the local viscosity of the coolant 109 and to increase a contribution of wall shear stress to retard the coolant 109 flow.

FIG. 5 shows another example in which the magnetic particles 114 are reconfigured due to output of a magnetic field 122 by an electromagnet 124 which may be located below the thermal plate 150. In this example, the output of the magnetic field 122 travels from below the thermal plate 150 (as represented by a series of directional Xs) and influences the magnetic particles 114 to reconfigure and collect at the wall 104 and the wall 106. Flow of the coolant 109 may be influenced to travel along a central portion of the flow field defined by the thermal plate 100. FIG. 6 shows another example in which the magnetic particles 114 are reconfigured due to output of magnetic fields 128 by electromagnets 130 and electromagnets 132. In this example, the output of the magnetic fields 128 influences the magnetic particles 114 to reconfigure and collect in the central portion of the flow field. Flow of the coolant 109 may be influenced to travel along outer portions of the flow field defined by the thermal plate 100. The locations of the electromagnets 130 and the electromagnets 132 in this example create two sub-coolant paths 136 and 138 of the flow field.

Figures 7, 8:
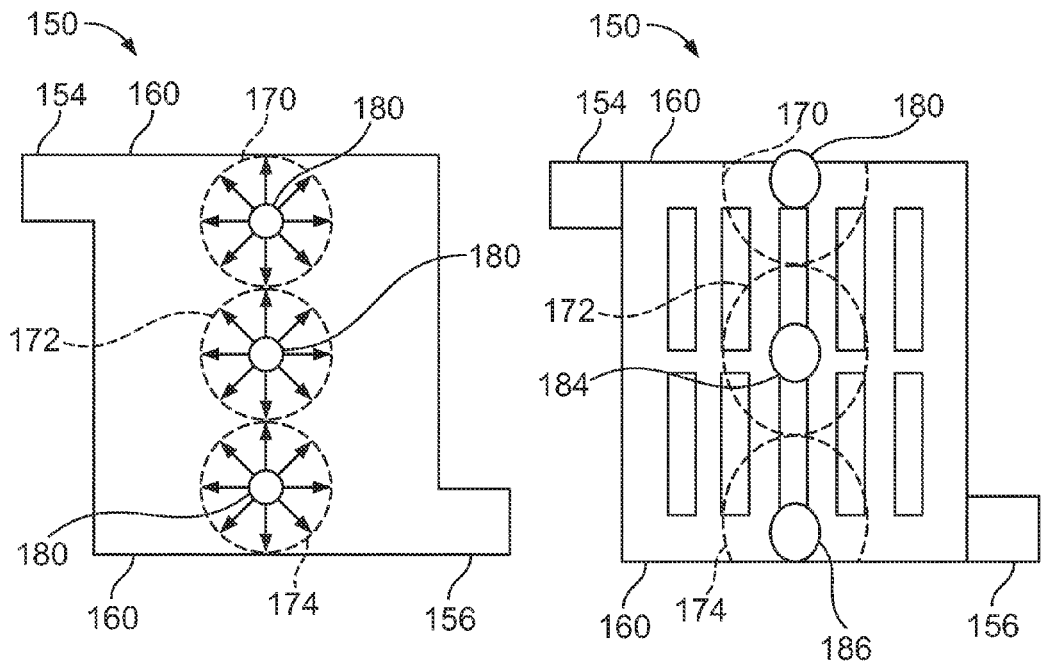
FIG. 7 is a plan view of another example of a thermal plate showing another example of an output of an electromagnetic valve assembly.
FIG. 8 is a plan view of the thermal plate and electromagnetic valve assembly from FIG. 7 showing an example of battery cell locations.

FIGS. 7 and 8 show an example of another thermal plate 150 which may utilize a magnetic valve assembly to control a flow of coolant having magnetic particles therein. The thermal plate 150 may include an inlet 154 and an outlet 156. A plurality of battery cells may be supported by the thermal plate 150 and/or in thermal communication therewith. A flow field for coolant is included between the inlet 154 and the outlet 156. For example, the thermal plate 150 may include a wall 160 to define the flow field therebetween. In other examples, the thermal plate 150 may define one or more extrusions within the flow field to distribute the coolant throughout the thermal plate 150. Battery cells 164 and 166 are shown spaced apart in one example of a battery cell configuration.

A magnetic valve assembly may assist in controlling the flow of coolant within the thermal plate 150. For example, the magnetic valve assembly may include one or more electromagnets as shown in FIG. 8. A first valve zone 170 may correspond to a first electromagnet 180. A second valve zone 172 may correspond to a second electromagnet 184. A third valve zone 174 may correspond to a third electromagnet 186. The valve zones are shown with directional arrows to represent an example of a direction of magnetic fields output by the electromagnets. A control system may direct operation of the magnetic valve assembly based on operating conditions of the battery cells. For example, a controller (not shown) may direct operation of the first electromagnet 180, the second electromagnet 184, and the third electromagnet 186. One or more sensors (not shown) may be located proximate to or integrated with the battery cells 164 and 166. The one or more sensors may measure temperature conditions of the battery cells. The one or more sensors may be in communication with the controller and configured to send one or more signals thereto. For example, the one or more sensors may include the measured temperature conditions in the one or more signals sent to the controller. The controller may be configured to, in response to receiving the one or more signals from the one or more sensors including the measured temperature of the battery cells, direct one or more of the electromagnets to adjust an output of a magnetic field such that the coolant flow is altered based on the measured temperature of the battery cells.

For example, the controller may receive a signal from one of the sensors indicating that battery cells proximate the first electromagnet 180 are operating at a temperature above a predetermined threshold. The predetermined threshold may be, for example, a battery cell temperature at which the battery cell may decrease in performance. The controller may direct the second electromagnet 184 and the third electromagnet 186 to output a magnetic field such that coolant is prohibited or limited from flowing through the second valve zone 172 and the third valve zone 174. As such, coolant may be directed toward the battery cells which are operating at a temperature above the predetermined threshold to assist in cooling the battery cells. In another example, the controller may receive a signal from one of the sensors indicating that battery cells proximate the second electromagnet 184 are operating at a temperature above the predetermined threshold. The controller may direct the first electromagnet 180 and the third electromagnet 186 to output a magnetic field such that coolant is prohibited or limited from flowing through the first valve zone 170 and the third valve zone 174. This magnetic valve assembly configuration provides a capability to control coolant flow within the thermal plate and without utilizing mechanical valves or mechanical components within the thermal plate 150. It is contemplated that other combinations of magnetic field outputs from the first electromagnet 180, the second electromagnet 184, and the third electromagnet 186 may alter a flow of the coolant within the thermal plate 150. Further, more or fewer electromagnets may be utilized to provide additional coolant flow control options.

Figure 9:
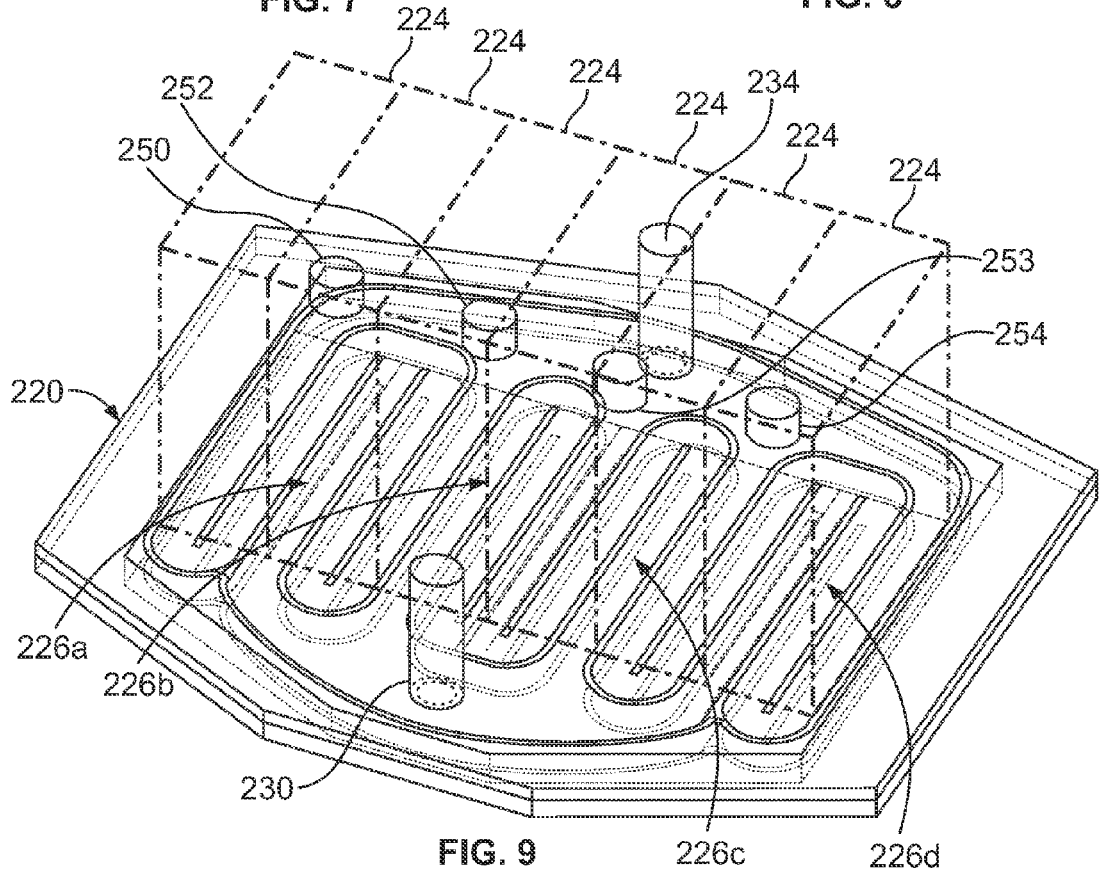
FIG. 9 is a perspective view of a portion of a traction battery showing examples of a thermal plate, an array of battery cells, and electromagnets of an electromagnetic valve assembly.

FIG. 9 shows another example of a thermal plate 220 which may utilize a magnetic valve assembly to assist in managing thermal conditions of an array of battery cells 224. The battery cells 224 may be in thermal communication with the thermal plate 220. In this example, coolant may enter and exit the thermal plate 220 via a plate inlet 230 and a plate outlet 234, respectively. The thermal plate 220 may define a plurality of multi-pass channels, such as a first multi-pass channel 226a, a second multi-pass channel 226b, a third multi-pass channel 226c, and a fourth multi-pass channel 226d (collectively referred to as "multi-pass channels 226" herein). Coolant may flow through the multi-pass channels 226 to assist in managing thermal conditions of the battery cells 224. One or more electromagnets may be arranged with the multi-pass channels 226 to assist in managing coolant flow within the thermal plate 220. For example, a first electromagnet 250 may be arranged with the first multi-pass channel 226a such that a magnetic field output of the first electromagnet 250 may influence magnetic particles of the coolant flowing toward or within the first multi-pass channel 226a. The influence of the magnetic field may be such that the magnetic particles are reconfigured to prohibit, limit, or alter coolant flow as described above. Similarly, a second electromagnet 252, a third electromagnet 254, and a fourth electromagnet 256 may influence magnetic particles of the coolant flowing toward or within the respective second multi-pass channel 226b, the third multi-pass channel 226c, and the fourth multi-pass channel 226d. In this example, the electromagnets are located above the battery cells 224.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle traction battery assembly comprising:
   an array of battery cells;
   a thermal plate in thermal communication with the array and defining a coolant flow field; and
   an electromagnet arranged with the coolant flow field to selectively output a magnetic field to influence magnetic particles to gather and remain stationary in a specific and predetermined pattern so that one or more separate coolant sub-paths are defined by coolant flowing therethrough.

2. The assembly of claim 1, wherein the predetermined pattern is a gathering of the magnetic particles along walls or between the walls defining the one or more separate coolant sub-paths.

3. The assembly of claim 1, further comprising:
   at least one sensor located proximate to the array and configured to output a signal indicative of a temperature of at least one of the battery cells; and
   a controller programmed to direct the electromagnet to adjust the magnetic field in response to the signal.

4. The assembly of claim 3, wherein the controller is further programmed to selectively direct the electromagnet to output a pulsed magnetic field to induce turbulence into the coolant flowing through the one or more separate coolant sub-paths.

5. The assembly of claim 3, wherein the controller is further programmed to direct the electromagnet to selectively output the magnetic field to restrict the coolant flowing through the one or more separate coolant sub-paths.

6. The assembly of claim 1, wherein the coolant is a magnetorheological fluid or ferrofluid.

7. The assembly of claim 1, wherein the predetermined pattern is a linear gathering of the magnetic particles along the magnetic field and perpendicular to the one or more separate coolant sub-paths.

* * * * *